H. ALBRECHT.
CLAMPING DEVICE FOR FLUTING-MACHINES.
No. 192,632. Patented July 3, 1877.
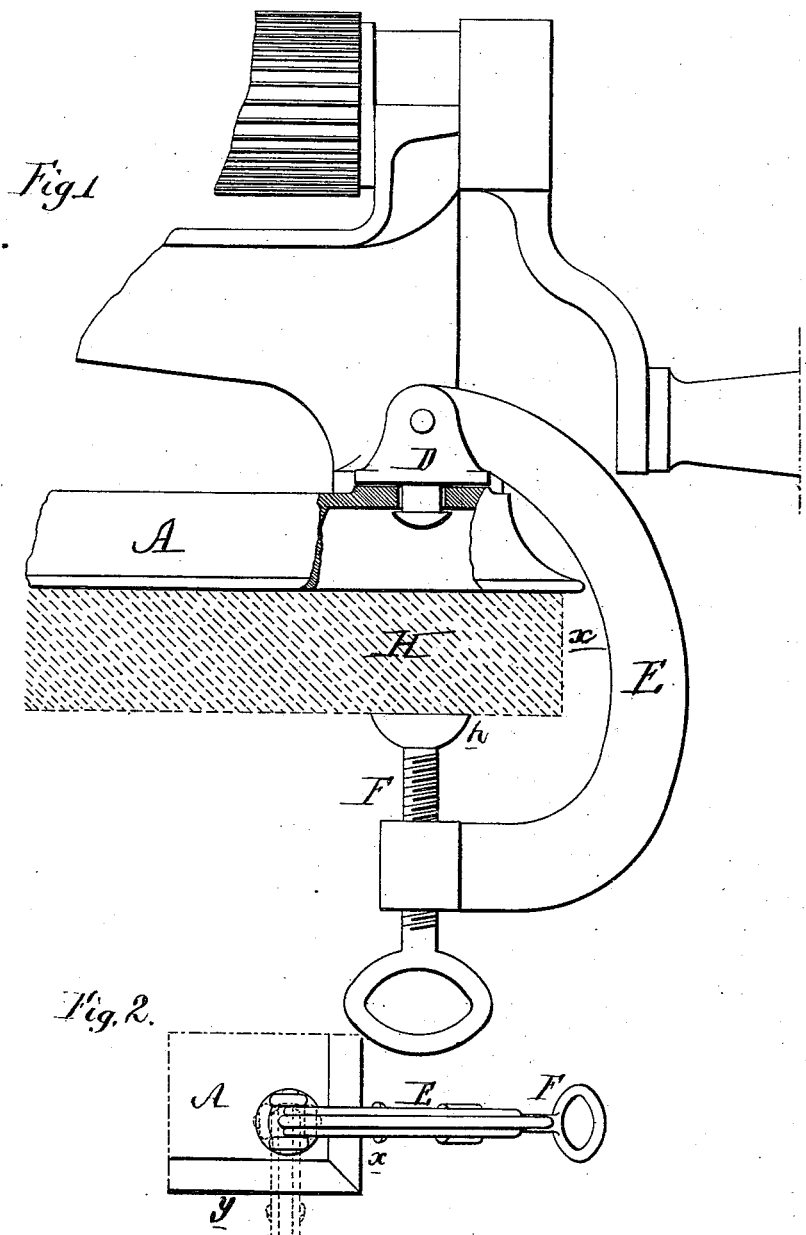

UNITED STATES PATENT OFFICE.

HERMANN ALBRECHT, OF PHILADELPHIA, PENNSYLVANIA.

IMPROVEMENT IN CLAMPING DEVICES FOR FLUTING-MACHINES.

Specification forming part of Letters Patent No. 192,632, dated July 3, 1877; application filed August 30, 1876.

*To all whom it may concern:*

Be it known that I, HERMANN ALBRECHT, of Philadelphia, Pennsylvania, have invented an Improvement in Clamping Devices for Fluting-Machines, of which the following is a specification:

The object of my invention is to provide a fluting or other domestic machine which has to be attached to a table with a clamping device which permits the adjustment not only of the machine but of the device itself to any position which may suit the convenience of the operator.

In the accompanying drawing my invention is illustrated as applied to the base of a fluting-machine, Figure 1 being a side view partly in section, and Fig. 2 a plan view.

A represents part of the base of the machine, and to this base is secured a stud, D, in such a manner as to be confined to the base vertically, but so that it can be turned laterally in any direction. To this stud is hinged one end of the curved clamping-arm E, the other end of which is furnished with a thumb-screw, F, and to the upper end of the latter a plate or washer, $h$, is connected in such a manner that the screw can be turned independently of the said plate, the upper face of which may be serrated or provided with projections so that it may have a firm hold of the under side of the table H.

The clamping-arm E, owing to the swivel-stud D, may be adjusted over the edge $x$ of the table H, as shown by plain lines in Fig. 2, or it may be adjusted to the position, shown by dotted lines in the same figure, over the edge $y$ of the table, or it may be adjusted in such other positions as the convenience of the operator on the machine may suggest, the arm and its screw F serving as an effective clamp for confining the machine to the table.

It will be seen that the clamping device permits the adjustment of the machine, of which it forms a part, to such different positions as the location of the table or the convenience of the operator may suggest. The clamp, moreover, may be moved to a position where it will not interfere with the convenient manipulation of the machine by the operator.

Although I have shown my improved clamping device as attached to a fluting-machine, and although it is especially useful in this connection, it will be evident that it may be adapted with advantage to the bases or frames of many domestic machines and appliances which are made for attachment to tables.

I claim as my invention—

The stud D, connected to the base A so as to be turned laterally thereon, in combination with the arm E, provided at one end with a screw, F, and hinged at the opposite end to the said stud D, all as set forth.

In testimony whereof I have signed my name to this specification in the presence of two subscribing witnesses.

HERMANN ALBRECHT.

Witnesses:
HUBERT HOWSON,
HENRY HOWSON, Jr.